UNITED STATES PATENT OFFICE.

WILLIAM C. EWING, OF LOS ANGELES, CALIFORNIA.

WHITE CEMENT.

1,239,579.     Specification of Letters Patent.     Patented Sept. 11, 1917.

No Drawing.     Application filed June 29, 1916. Serial No. 106,627.

*To all whom it may concern:*

Be it known that I, WILLIAM C. EWING, a citizen of the United States, residing at Los Angeles, county of Los Angeles, State of California, have invented a certain new and useful Improved White Cement, of which the following is a specification.

My invention relates to a composition of material for building purposes, and has especial reference to a Portland cement and the treatment thereof for the purpose of whitening the same and making it adaptable to a variety of uses, where the ordinary gray cement would not be as satisfactory, nor give the effect desired in certain classes of work.

An object of this invention is to provide a cement that may be used generally for building, for mural and other interior and exterior work and finish and as an excellent substitute for stucco and plaster, and in which the qualities of eventual hardness and density are maintained, and the monotonous tone color of the common gray cement is supplanted by a lustrous hue accompanied by a glaze on the surface.

Another object of my invention is to provide a cement whose base is commercial Portland cement, which, by the admixtures hereinafter referred to, is given a whitish color, the tone of which may vary as conditions may require.

In carrying out my invention, silica or a siliceous substance, such as infusorial earth or diatomaceous earth, is first mixed with a proper proportion of hydrate of lime, the proportion being, according to my experiments, approximately about half of each, but susceptible to variations as required by the results to be obtained.

This mixture of silica and lime is thereupon added to and mixed with commercial Portland cement, the mixture of silica and lime sustaining a proportion of approximately 10% to the volume of cement used, per avoirdupois weight.

These ingredients are thoroughly mixed together in a dry condition and the conversion, of the product thus yielded, into a cement mortar or conglomerate requires but the addition of the necessary other ingredients; or the mixed product may be stored away for future use.

I have discovered that by this composition there is produced a commercial whitened Portland cement, which, when made into a cement mortar or conglomerate, has a pleasing pearly color and somewhat glazed surface, which retains its luster and grows harder with age and consequently remains unaffected by atmospheric changes, or heat or cold, such as ordinarily exist in buildings or dwellings.

The proportions herein named may vary for different uses, but for general practical building purposes, the proportions named are to be preferred, in order that the tensile strength of the cement be preserved.

Ordinary silica will not answer to give a clean, pearly color and luster and a glazed surface as aimed at by this invention, because of its lifeless appearance and grayish hue. As far as I am aware, silica or diatomaceous earth or infusorial earth are the only commercial substances that when mixed as and in the proportions herein pointed out will yield a product with the characteristics as described.

What I claim is:—

1. The herein described composition of matter consisting of commercial Portland cement, and silica and calcium hydrate mixed in equal proportion, the proportion of the silica and calcium hydrate to the cement being approximately as 1 to 10.

2. The herein described composition of matter consisting of an equal proportion of diatomaceous earth and calcium hydrate mixed together in a dry state, and commercial Portland cement, the proportion of the diatomaceous earth and calcium hydrate mixture to the cement being approximately as one to ten.

In testimony whereof I have set my hand in the presence of two witnesses.

WILLIAM C. EWING.

Witnesses:
   HENRY E. STORRS,
   FRANK NEWNHAM.